United States Patent
Muto et al.

(10) Patent No.: US 9,573,561 B2
(45) Date of Patent: Feb. 21, 2017

(54) METHODS AND APPARATUS FOR RESTRAINING VEHICULAR PASSENGERS

(71) Applicant: Honda Motor Co., Ltd., Tokyo (JP)

(72) Inventors: Noriyuki Muto, Columbus, OH (US); Adam Joseph Upah, Cable, OH (US); Robert T. Wilson, III, Marysville, OH (US); Matthew Lee Taracko, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 14/639,022

(22) Filed: Mar. 4, 2015

(65) Prior Publication Data

US 2016/0257283 A1 Sep. 8, 2016

(51) Int. Cl.
*B60R 22/26* (2006.01)
*B60R 22/22* (2006.01)
*B60R 22/02* (2006.01)

(52) U.S. Cl.
CPC ............ *B60R 22/26* (2013.01); *B60R 22/023* (2013.01); *B60R 22/22* (2013.01); *B60R 2022/027* (2013.01)

(58) Field of Classification Search
CPC .......... B60R 22/26; B60R 22/02; B60R 22/46; B60R 22/24; B60R 22/22; B60R 22/023; B60R 2022/027
USPC ......................................... 297/484; 280/808
See application file for complete search history.

(56) References Cited

U.S. PATENT DOCUMENTS

| | | | |
|---|---|---|---|
| 4,099,778 A * | 7/1978 | Lehr ................... | B60R 22/105 280/805 |
| 4,231,616 A * | 11/1980 | Painter ................... | B60R 22/02 280/808 |
| 5,176,402 A * | 1/1993 | Coulon ................... | B60R 22/26 280/807 |
| 5,203,829 A | 4/1993 | Fisk et al. | |
| 6,076,894 A | 6/2000 | Busch | |
| 6,139,111 A | 10/2000 | Pywell et al. | |
| 6,367,882 B1 * | 4/2002 | Van Druff ............. | B64D 25/06 297/467 |
| 6,773,075 B2 | 8/2004 | Rouhana et al. | |

(Continued)

FOREIGN PATENT DOCUMENTS

| | | | |
|---|---|---|---|
| EP | 1942036 B1 | 7/2008 | |
| FR | 2661144 A1 * | 10/1991 | ............ B60R 22/02 |
| JP | 2004-330975 A | 11/2004 | |

*Primary Examiner* — Milton Nelson, Jr.
(74) *Attorney, Agent, or Firm* — Kenealy Vaidya LLP

(57) ABSTRACT

A vehicular seat belt assembly can include a pair of lateral webbing strips configured to extend laterally across a first portion of vehicular passenger, distal ends being statically secured to the vehicular support structure, and proximal ends being selectively connected to and disconnected from each other. A pair of upper body strips can be configured to contact a second portion the passenger. An anchor can be statically secured to the vehicular support structure, and configured to guide each of the upper body strips so as to enable a change in a direction of extension of the upper body strips, and to thereby absorb a portion of a load created by the force applied to the passenger and applied to the upper body strips. A retractor assembly can be configured to enable length adjustment of the upper body strips if the load is below a certain threshold level.

20 Claims, 5 Drawing Sheets

(56) References Cited

U.S. PATENT DOCUMENTS

| | | | |
|---|---|---|---|
| 7,481,399 B2 | 1/2009 | Nöhren et al. | |
| 7,625,048 B2 | 12/2009 | Rouhana et al. | |
| 8,419,127 B1* | 4/2013 | Wilhelm | B60R 22/02 |
| | | | 280/808 |
| 8,469,401 B2* | 6/2013 | Humbert | B60N 2/24 |
| | | | 280/801.1 |
| 2013/0062144 A1 | 3/2013 | Fleming | |
| 2014/0103627 A1 | 4/2014 | Deckard et al. | |
| 2014/0138942 A1 | 5/2014 | Rouhana | |
| 2014/0167459 A1 | 6/2014 | Merrill et al. | |
| 2015/0069813 A1* | 3/2015 | Furr | B60R 22/00 |
| | | | 297/484 |

* cited by examiner

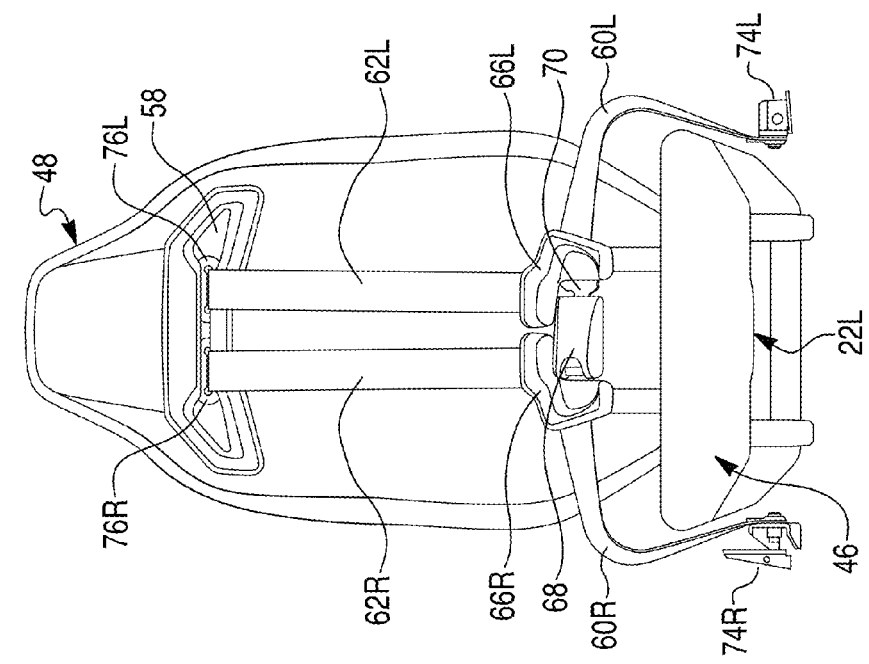

METHODS AND APPARATUS FOR RESTRAINING VEHICULAR PASSENGERS

BACKGROUND

The disclosed subject matter relates to methods and apparatus for restraining vehicular passengers. More particularly, the disclosed subject matter relates to vehicular seat belt assemblies, vehicular seating and restraining systems, methods of restraining vehicular passengers, and methods of manufacturing vehicular seat belt assemblies as well as vehicular seating and restraining systems.

Vehicles can be provided with various systems and apparatus for restraining vehicular passengers, such as during an impact event. For example, some related art vehicles are provided with seat belt assemblies that help to restrain the movement of a vehicular passenger in the event of contact with another object or other event that may transmit potentially harmful forces to the passenger. Under these conditions, the seat belt assembly restrains the vehicular passenger to hold the passenger in the passenger's seat to reduce or prevent injuries, such as by impeding or preventing the passenger from contacting other objects, e.g., portions of the vehicle's interior. As one example, in the event of a frontal impact, the forces resulting from the impact could otherwise cause the passenger to move forward and contact a portion of the vehicular interior immediately in front of the passenger. However, the seat belt assembly instead restrains the passenger in the passenger's seat to impede or prevent this contact, thereby reducing, mitigating or preventing passenger injuries.

SUMMARY

Traditional seat belt assemblies, which are still used on many commercial aircraft, utilize a two-point connection system, where opposing strips of webbing extend laterally across a passenger's lap and are removably connected at approximately a midpoint over the passenger's lap, such as via a buckle or other temporary attachment mechanism. The remaining end of each webbing strip is connected to a structural member so as to restrain the passenger while the webbing strips are buckled. However, the restraint provided by a two-point connection system is only effective based on contact with the passenger's lap, and thus fails to provide restraint for an upper portion of the passenger's body.

Three-point seat belt assemblies, which include a webbing strip extending both laterally across a passenger's lap and diagonally (with a vertical component) across the passenger's shoulder, chest and/or abdomen, may be beneficial by also providing upper body restraint. Three points are connected to structural member(s), including: 1) one end of a buckle assembly (or other temporary attachment mechanism); 2) one end of the webbing strip that extends laterally across the passenger's lap, and 3) the other end of the webbing strip that extends across the passenger's shoulder, chest and/or abdomen.

The third connection point may be provided via a retractor, which is statically connected to the structural member. The retractor can contain an adjustable length of the webbing strip and can apply a biasing force on the webbing strip to maintain tension on the webbing strip, while simultaneously allowing limited motion of the upper torso of the passenger during normal operation of the vehicle. The adjustable length of the webbing strip can accommodate passengers of different sizes and can facilitate buckling and unbuckling of the seat belt assembly. The retractor can enable a tongue (or other temporary attachment mechanism), which is attached to the vertically extending member, to be moved toward or away from, and thereby removably connected to or disconnected from, the buckle assembly.

Once buckled, the retractor can hold in place the webbing strip laterally across the passenger's lap and the webbing strip diagonally across the passenger's shoulder, chest and/ or abdomen. The buckle and tongue can be connectable at a location laterally adjacent the passenger, enabling this configuration to provide support for the passenger's lap as well as some level of support for the passenger's upper body. Additionally, during a sudden change in acceleration, such as during an accidental impact event, the retractor can apply an additional force that can draw the webbing strip tight against the passenger's torso and can maintain this additional force until the accidental impact event ends.

Off-road vehicles, such as but not limited to single seat 4-wheel all-terrain-vehicles (ATVs), multiple-seat ATVs, dune buggies, etc., can travel across rough terrain. As a result, the passengers can bounce around in the seat while remaining restrained by the seat belt assembly. Under such conditions, a passenger can perceive a three-point seat belt assembly as uncomfortable.

Thus, it may be beneficial to provide a multiple point seat belt assembly, as well as related methods of using and manufacturing, that provide support for the passenger's lap as well as more significant support for the passenger's upper body. For example, it may be beneficial to provide webbing strips that extend laterally across the passenger's lap, as well as multiple, and in some cases two, vertically extending webbing strips to provide enhanced support for the passenger's upper body. This enhanced support can be provided by securing one end of each laterally extending webbing strip to a structural component (with the opposite ends being removably connectable to each other such as via a buckle and tongue), and also securing one end of each vertically extending webbing strip to a respective one of the laterally extending webbing strips. It may also be beneficial to facilitate webbing strip length adjustment, e.g., to facilitate connecting/disconnecting the buckle and tongue, or to provide an advantageous restraint force during an impact event, such as via a retractor.

Some embodiments are therefore directed to a vehicular seat belt assembly for restraining a vehicular passenger disposed in a seat upon application of a force applied to the passenger, the restraint being performed via cooperation with a vehicular support structure and based at least in part by contact with the passenger's lap and upper body. The vehicular seat belt assembly can include a pair of lateral webbing strips configured to extend laterally across the passenger's lap. A distal end of each lateral webbing strip can be statically secured to the vehicular support structure, and proximal ends of the lateral webbing strips can be configured to be manually connectable and dis-connectable from each other. A vertically extending webbing strip can include a pair of upper body strips that are configured to contact opposite sides of a front of the passenger's upper body. A proximal end of each upper body strip can be connected to a respective one of the lateral webbing strips.

An anchor can be statically secured to the vehicular support structure. The anchor can be configured to guide each of the upper body strips so as to enable a change in a direction of extension of the upper body strips, and to thereby absorb a portion of a load created by the force applied to the passenger and applied to the upper body strips. A retractor assembly can be configured to enable length adjustment of the vertically extending webbing strip if the load applied to the upper body strips is below a certain threshold level, while limiting or disabling length adjustment of the vertically extending webbing strip if the load is substantially equal to or greater than the certain threshold level.

Some other embodiments are directed to a vehicular seating and restraint system for restraining a vehicular passenger upon application of a force applied to the passenger, the restraint being performed via cooperation with a vehicular support structure and based at least in part by contact with the passenger's lap and upper body. The vehicular seating and restraint system can include a seat that includes an upper portion defining an aperture and opposing front and back sides, the front side being configured to support the passenger's upper body.

The vehicular seating and restraint system can also include a vehicular seat belt assembly. The assembly can include a lap restraint assembly that includes a pair of lap anchors and a pair of lateral webbing strips that are configured to extend laterally across the passenger's lap and that each define distal and proximal ends. The distal end of each lateral webbing strip can be statically secured to the vehicular support structure by one of the lap anchors, and the proximal ends can be manually connectable and dis-connectable from each other. A vertically extending webbing strip can include a pair of upper body strips that are configured to contact opposite sides of a front of the passenger's upper body and extend through the aperture of the seat. A proximal end of each upper body strip can be connected to a respective one of the lateral webbing strips.

An anchor can be statically secured to the vehicular support structure adjacent the back side of the upper portion of the seat. The anchor can be configured to guide each of the upper body strips so as to enable a change in a direction of extension of the upper body strips, and to thereby absorb a portion of a load created by the force applied to the passenger and applied to the upper body strips. A retractor assembly can be configured to enable length adjustment of the vertically extending webbing strip if the load applied to the upper body strips is below a certain threshold level, while limiting or disabling length adjustment of the vertically extending webbing strip if the load is substantially equal to or greater than the certain threshold level.

Still other embodiments are directed to a method of configuring a vehicular seat belt assembly to enable restraint of a vehicular passenger disposed in a seat upon application of a force applied to the passenger. The method can include extending a pair of lateral webbing strips laterally across a lower portion of the seat such that proximal ends of the lateral webbing strips are manually connectable to and dis-connectable from each other; statically securing a distal end of each lateral webbing strip to a vehicular support structure; disposing a vertically extending webbing strip, which includes a pair of upper body strips, such that the upper body strips extend over opposite sides of a front of an upper portion of the seat; and connecting a proximal end of each upper body strip to a respective one of the lateral webbing strips.

The method can also include statically securing an anchor to the vehicular support structure; disposing the anchor to guide each of the upper body strips so as to enable a change in a direction of extension of the upper body strips, and to thereby be configured to absorb a portion of a load created by the force applied to the passenger and applied to the upper body strips; and connecting a retractor assembly to the vertically extending webbing strip to enable length adjustment of the vertically extending webbing strip if a load applied to the upper body strips is below a certain threshold level, while limiting or disabling length adjustment of the vertically extending webbing strip if the load is substantially equal to or greater than the certain threshold level.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 5 is a front view of the exemplary seating and restraint system of FIG. 4.

FIG. 6 is a rear view of the exemplary seating and restraint system of FIG. 4.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle

Figure 1:
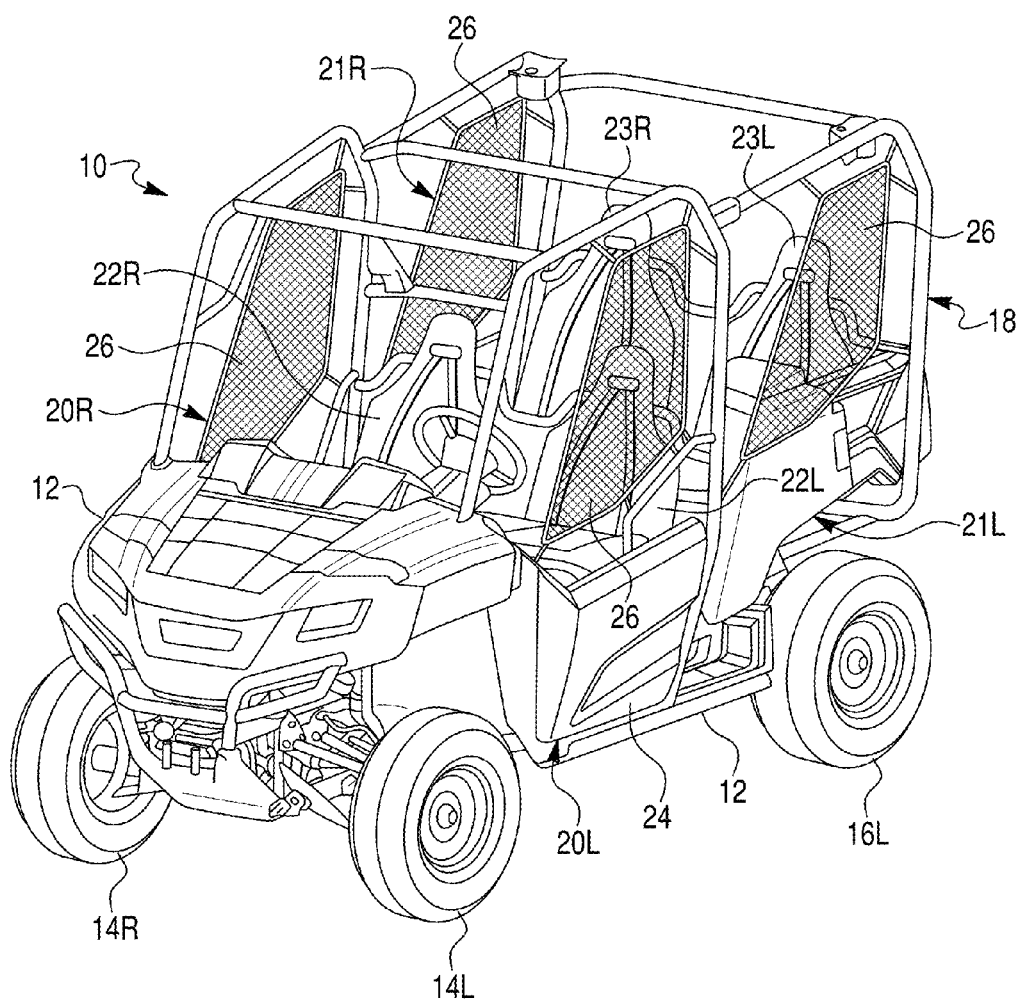
FIG. 1 is a perspective view of an exemplary vehicle including a seating and restraint system with a seat belt assembly in accordance with the disclosed subject matter.

FIG. 1 is a perspective view of an exemplary vehicle 10 including a seating and restraint system with a seat belt assembly in accordance with the disclosed subject matter. The vehicle 10 shown in FIG. 1 is specialized for use on an unimproved path or on an unmarked path, and can be referred to as a multipurpose utility vehicle (MUV) or as a side-by-side all-terrain vehicle (SxS, or SxS ATV).

However, the disclosed seating and restraint system with seat belt assembly can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc. In fact, embodiments are intended to include or otherwise cover configurations of the seating and restraint system with seat belt assembly for use in any other type of vehicle, such as an aircraft, boat, ship, train, spacecraft, etc. Some other embodiments can be used in non-vehicular applications, such as for amusement park rides, playground apparatus, or any other situation where a seating and restraint system can enhance outcomes subsequent to transmission of a force.

The vehicle 10 can include a body 12, a pair of front wheels, 14L, 14R, a pair of rear wheels 16L, 16R (the right-side rear wheel 16R is obstructed from view), a roll cage 18, a pair of front door assemblies 20L, 20R, a pair of rear door assemblies 21L, 21R, a frame assembly, and a powertrain. The frame assembly is hidden from view in FIG.

Figure 2:
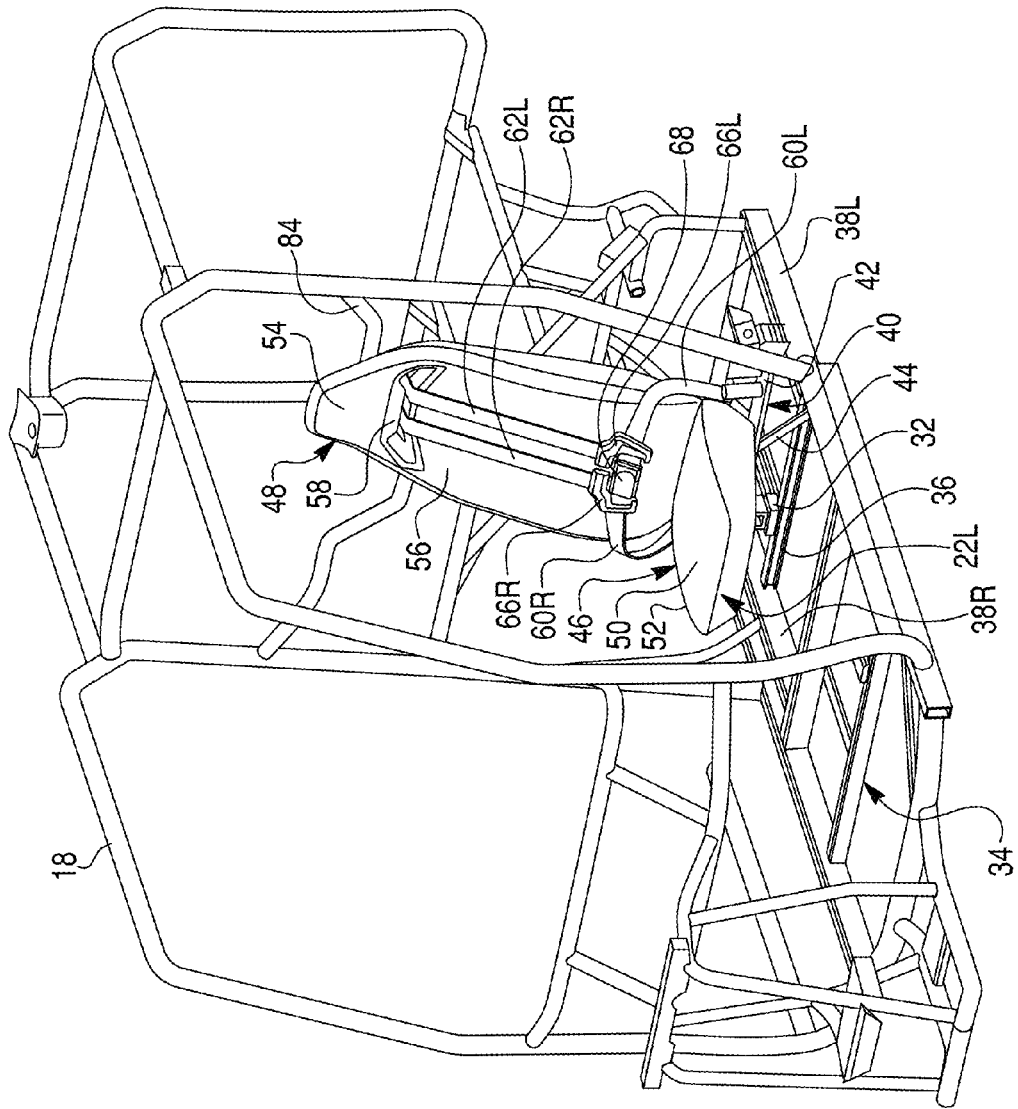
FIG. 2 is a perspective view of the vehicle of FIG. 1 in a partially assembled state.

1 by the body 12 (but portions thereof are shown in FIG. 2), and the powertrain is omitted from FIG. 1 for simplicity and clarity of the drawing.

The vehicle 10 can include a pair of front seats 22L, 22R and a pair of rear seats 23L, 23R mounted in a passenger area of the vehicle 10. The roll cage 18 can be configured to extend around and above the seats 22L, 22R, 23L, 23R and the passenger area. The roll cage 18 can cooperate with the body 12 and/or at least a portion of the frame assembly to define a pair of door openings through which a passenger may pass in order to enter or exit the passenger area.

The door assemblies 20L, 20R, 21L, 21R each can include a door 24 and window panel assembly 26 and can be configured to selectively open and close access through the door openings by moving between a closed position and a fully opened position. In the closed position, the door assemblies 20L, 20R, 21L, 21R can span the respective door openings to obstruct access to the passenger area via the door openings. In the closed position, the front portion of each door assembly 20L, 20R, 21L, 21R can be latched to the roll cage 18. The fully opened position can be any position where the door assemblies 20L, 20R, 21L, 21R are pivoted away from the respective door openings to provide substantially unobstructed access to the passenger area via the door openings. FIG. 1 shows the door assemblies 20L, 20R, 21L, 21R in the closed position.

Each seat 22L, 22R, 23L, 23R of the vehicle 10 also can include a vehicular seat belt assembly 30, which is discussed in more detail below.

II. Seat and Seat Supporting Mounts

FIG. 2 is a perspective view of the vehicle 10 shown in FIG. 1 in a partially-assembled state. In FIG. 2, the body 12, the right-side front seat 22R and the rear seats 23L, 23R of vehicle 10, along with other features, are omitted for simplicity and clarity of FIG. 2. It is to be understood that the right-side seat 22R and the rear seats 23L, 23R can be connected to the vehicle 10 and can interact with a respective vehicular seat belt assembly 30 to provide a vehicular seating and restraint system as described below with reference to the left-side front seat 22L.

As shown in FIG. 2, the seat 22L can include a lower seat portion 46 (also referred to as a seat bottom) and an upper seat portion 48 (also referred to as a seat back). However, embodiments are intended to include or otherwise cover other types of seats, including seats that do not necessarily define discrete lower and upper portions. For example, some embodiments are directed to seats that include a single unitary or integral structure.

The lower seat portion 46 can include a seat horizontal surface 50 configured to support a passenger's lower body portion. However, this surface does not need to be horizontal, and embodiments are intended to include or otherwise cover surfaces that extend at any angle and that are otherwise capable of supporting a passenger or certain parts of the passenger's body. The lower seat portion 46 also can include a lower seat perimeter extension 52 (also referred to as a hip bolster) that can extend around at least a portion of the perimeter of the seat horizontal surface 50. The lower seat perimeter extension 52 shown in FIG. 2 can extend higher above the seat horizontal surface 50 at its mid-point than at the front and rear, and can enhance passenger stability and/or comfort. However, embodiments are intended to include other alternative structures, as well as seats 22L that do not include this feature at all.

The upper seat portion 48 can include a seat vertical surface 54 configured to support a passenger's upper body portion. However, this surface does not need to be vertical, and embodiments are intended to include or otherwise cover surfaces that extend at any angle and that are otherwise capable of supporting a passenger or certain parts of the passenger's body. The upper seat portion 48 also can include an upper seat perimeter extension 56 (also referred to as a side bolster) that extends around at least a portion of the perimeter of the seat vertical surface 54. The upper seat perimeter extension 56 shown in FIG. 2 can be configured to enhance passenger stability and/or comfort. However, embodiments are intended to include other alternative structures, as well as seats 22L that do not include this feature at all.

Embodiments are intended to include or otherwise cover any structure for connecting the seat 22L to any relevant part of the vehicle 10. In the embodiment shown in FIG. 2, the seat 22L can be connected to a vehicle frame 34 such that the seat 22L and frame 34 do not move relative to each other. However, the seat 22L of other embodiments can be connected to the frame 34 so as to be movable relative to the frame 34, such as a seat that can slide along a track between a plurality of lockable positions, or movable in other ways such as in the case of an arcade game, simulator, etc.

In FIG. 2, the vehicle frame 34 can include a frame cross-bar 36 and longitudinally extending frame members 38L, 38R. The longitudinally extending frame members 38L, 38R can extend generally parallel to each other, and the frame cross-bar 36 can extend generally perpendicular thereto. Opposite ends of the frame cross-bar 36 can be connected to the longitudinally extending frame members 38L, 38R.

A lower surface of the seat 22L can be connected to the frame cross-bar 36 by a center seat mount assembly 32. More particularly, an upper surface of the center seat mount assembly 32 can be connected to a lower surface of the lower seat portion 46 at or near its front end. A lower surface of the center seat mount assembly 32 can be connected to an upper surface of the frame cross-bar 36, which thereby can connect the seat 22L to the vehicle frame 34.

The seat 22L also can be connected to the vehicle frame 34 or other vehicular structural elements via a rear seat mount assembly 40. The rear seat mount assembly 40 can include a rear cross-bar support member 42 that can be connected to the lower surface of the lower seat portion 46 at or near its rear end. The rear cross-bar support member 42 can be connected to the vehicle frame 34 or other vehicular structural element(s) via a rear vertical support member 44.

The seat 22L thereby can be securely connected to the vehicle frame 34 via the center seat mount assembly 32 as well as the rear seat mount assembly 40. However, as indicated above, embodiments are intended to include or otherwise be used with any other relevant seat configuration, seat attachment configurations, etc.

III. Seat Belt Assembly Structure

Figure 3:
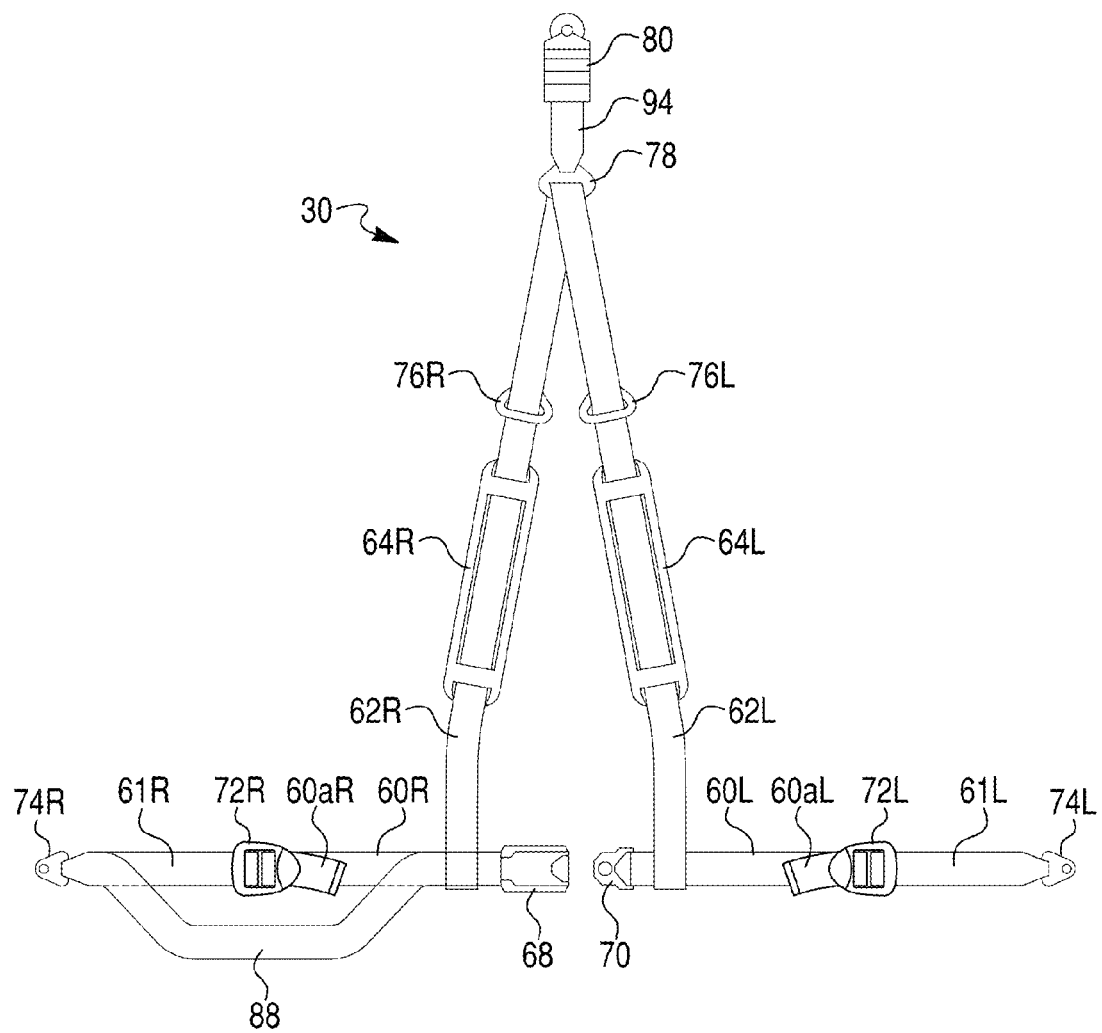
FIG. 3 is a front view of an exemplary seat belt assembly in accordance with the disclosed subject matter.

FIG. 3 is a front view of the exemplary vehicular seat belt assembly 30 in usable with the vehicle 10 of FIGS. 1 and 2. The disclosed vehicular seat belt assembly 30 can be configured to restrain a vehicular passenger disposed in the seat 22L upon application of a force applied to the passenger. As discussed in detail below, the restraint can be performed at least in part by contact with first and second portions of the passenger (for example, the passenger's lap and upper body).

The vehicular seat belt assembly 30 can include a pair of upper lap webbing strips 60L, 60R configured to extend laterally across the passenger's lap. A pair of lap webbing length adjusters 72L, 72R connects the upper lap webbing strips 60L, 60R to a pair of lower lap webbing strips 61L, 61R. The length of the upper lap webbing strips 60L, 60R is manually adjustable by the lap webbing length adjusters 72L, 72R to enable users of different sizes to be properly fitted. A distal end of each of the lower lap webbing strips 61L, 61R can be statically secured to a vehicular support structure, and proximal ends of the upper lap webbing strips 60L, 60R can be configured to be manually and selectively connected to and disconnected from each other. Each of the upper webbing strips 60L, 60R can include an adjustable portion 60aL, 60aR that can extend through a respective one of the length adjusters 72L, 72R so that the length of the upper webbing strips can be selectively increased and decreased.

The upper and lower lap webbing strips 60L, 60R, 61L, 61R can be formed of any appropriate material currently available or later developed that enables performance of their functions. For example, it could be advantageous to form the upper and lower lap webbing strips 60L, 60R, 61L, 61R from a flexible material that: 1) will not break or otherwise fail upon application of predictable forces; 2) be sufficiently resistant to wear or other challenges caused by periodic usage; and 3) provide a sufficient level of comfort to passengers.

Embodiments are intended to include or otherwise cover any appropriate mechanism for securing the distal ends of the lower lap webbing strips 61L, 61R to any vehicular support structure, such as the vehicle frame 34. In the embodiment of FIG. 3, lap webbing anchors 74L, 74R can be provided at the distal ends of the lower lap webbing strips 61L, 61R to facilitate this connection. As shown in FIGS. 5 and 6, the lap webbing anchors 74L, 74R can be secured to the vehicle frame 34 by brackets. However, as indicated above, embodiments are intended to cover any known, related art, or later developed technique for performing this rigid connection.

Embodiments are intended to include or otherwise cover any mechanism for enabling the proximal ends of the upper lap webbing strips 60L, 60R to be manually and selectively connected to and disconnected from each other. In the embodiment of FIG. 3, a buckle 68 can be provided at the proximal end of one of the upper lap webbing strips 60L, 60R, while a tongue 70 can be provided at the proximal end of the other of the upper lap webbing strips 60L, 60R. The buckle 68 and tongue 70 can be configured to be manually connectable to each other. For example, the tongue 70 can be received into an aperture in the buckle 68, and upon extending a certain distance within the aperture engages internal component(s) of the buckle 68 to be locked thereto. The buckle 68 also can include a manually actuable release mechanism that enables an operator to unlock the buckle 68 and tongue 70 from each other and thereby enable the proximal ends of the upper lap webbing strips 60L, 60R to be separated.

The upper lap webbing strips 60L, 60R can include any other or additional apparatus for enabling adjustment of their lengths, such as to provide for passengers of different sizes. For example, the buckle 68 can be configured to enable lengths of the upper lap webbing strips 60L, 60R to be increased or shortened so that the buckle 68 and tongue 70 can be locked together over the laps of different sized passengers. The lengths of the upper lap webbing strips 60L, 60R can also be increased or shortened after the buckle 68 and tongue 70 are locked together to enable adjustment of the upper lap webbing strips 60L, 60R, such as to provide for tightening or loosening.

As shown in FIG. 3, a length of harness webbing 88 can be provided to facilitate or achieve any other purpose.

The vehicular seat belt assembly 30 can also include a vertically extending webbing strip including a pair of shoulder webbing strips 62L, 62R that are configured to contact opposite sides of a front of the passenger's upper body. A proximal end of each of the shoulder webbing strips 62L, 62R can be connected to one of the upper lap webbing strips 60L, 60R. Embodiments are intended to include or otherwise cover any appropriate mechanism for attaching the shoulder webbing strips 62L, 62R to the upper lap webbing strips 60L, 60R, such as by stitching. However, embodiments are intended to cover other known, related art or later developed attaching techniques, such as by rivets, clips, glue, epoxy, etc.

The shoulder webbing strips 62L, 62R can be formed of the same material as the upper and lower lap webbing strips 60L, 60R, 61L, 61R. However, the shoulder webbing strips 62L, 62R can be formed of any other material currently available or later developed that enables performance of their functions. For example, it would be advantageous to form the shoulder webbing strips 62L, 62R from any other flexible material that: 1) will not break or otherwise fail upon application of predictable forces; 2) be sufficiently resistant to wear or other challenges caused by periodic usage; and 3) provide a sufficient level of comfort to passengers.

Each of the shoulder webbing strips 62L, 62R can be provided with a shoulder/chest pad 64L, 64R for any advantageous purpose, such as to enhance passenger comfort or to enhance the ability of the shoulder webbing strips 62L, 62R to retain the passenger in place. In the embodiment of FIG. 3, the shoulder/chest pads 64L, 64R each define a width that is greater than a width of the corresponding shoulder webbing strips 62L, 62R. This greater width increases the surface area in contact with the passenger's upper body to perform the advantages cited above.

The shoulder/chest pads 64L, 64R can be configured to facilitate or enhance any of the above or other advantages. For example, the shoulder/chest pads 64L, 64R can be provided with padding to enhance passenger comfort. The shoulder/chest pads 64L, 64R can also be disposed at an appropriate location to facilitate or enhance any of the above or other advantages. For example, the shoulder/chest pads 64L, 64R can be positioned to contact a portion of the passenger's upper body that will enhance comfort and/or reduce, impede or prevent injuries should the passenger experience a force and thereby be retained in the seat 22L at least in part by virtue of contact with the shoulder/chest pads 64L, 64R.

In the embodiment shown in FIG. 3, the shoulder webbing strips 62L, 62R form a unitary vertically extending webbing strip. The shoulder webbing strips 62L, 62R can meet at a webbing ring 78 that enables the unitary vertically extending webbing strip to change its direction of extension, and thereby form the separate shoulder webbing strips 62L, 62R and form at least in part a V-shaped configuration. Embodiments are intended to include or otherwise cover any type of webbing ring 78 that enables the unitary vertically extending webbing strip to change its direction of extension. In the embodiment shown in FIG. 3, the webbing ring 78 can define a channel through which the unitary vertically extending webbing strip extends to facilitate its change of direction of extension.

The vehicular seat belt assembly 30 can include guides that help to guide the upper lap webbing strips 60L, 60R and/or shoulder webbing strips 62L, 62R into desired extension directions and/or orientations. For example, in the embodiment shown in FIGS. 2 and 5, a lower restraint/guide 66L, 66R can be provided at each side of the buckle 68 and tongue 70. In particular, as shown in FIG. 5, each lower restraint/guide 66L, 66R can be formed so as to have upper and lower horizontally extending sections that are connected by a generally vertically extending section (hereinafter "C-shaped") and disposed adjacent the proximal end of one of the lateral webbing strips. Each C-shaped lower restraint/ guide 66L, 66R can define a pair of apertures that are configured such that a respective one of the upper lap webbing strips 60L, 60R extends through one of the pair of apertures and a respective one of the shoulder webbing strips 62L, 62R extends through the other aperture.

The vehicular seat belt assembly 30 also can include an anchor that is positioned and configured to guide each of the shoulder webbing strips 62L, 62R so as to enable a change in a direction of extension of the shoulder webbing strips 62L, 62R, and to thereby absorb a portion of a load created by the force applied to the passenger and applied to the shoulder webbing strips 62L, 62R. In the embodiment shown in FIG. 3, the anchor can include a pair of D-Ring anchors 76L, 76R. One of the D-Ring anchors 76L, 76R can be provided for each of the shoulder webbing strips 62L, 62R. For example, each of the shoulder webbing strips 62L, 62R can extend through an aperture defined in a respective one of the D-Ring anchors 76L, 76R. As discussed in detail below with regard to FIGS. 4-6, the D-Ring anchors 76L, 76R can be statically secured to the vehicular support structure, which can enable the D-Ring anchors 76L, 76R and vehicular support structure to absorb a portion of a load created by the force applied to the passenger and applied to the shoulder webbing strips 62L, 62R.

However, embodiments are intended to include or otherwise cover any other anchoring apparatus that can perform the above operations, including currently available or later developed structures. For example any type of anchor can be used that enables a change in a direction of extension of the shoulder webbing strips 62L, 62R, while also absorbs a portion of a load created by the force applied to the passenger and applied to the shoulder webbing strips 62L, 62R.

The vehicular seat belt assembly 30 also can include a retractor assembly that can be configured to enable length adjustment of the shoulder webbing strips 62L, 62R under certain circumstances. For example, the retractor assembly can be configured to limit or disable length adjustment of the shoulder webbing strips 62L, 62R if a load is applied to the passenger and/or shoulder webbing strips 62L, 62R that exceeds a certain level. In other words, the retractor assembly can be configured to apply a force to the shoulder webbing strips 62L, 62R so that they tighten against the passenger during an impact event and remain so until the impact event ends.

For example, if the passenger and/or shoulder webbing strips 62L, 62R are subject to significant forces, such as those created by a vehicular impact event, the retractor assembly can impede length adjustment of the shoulder webbing strips 62L, 62R and in fact can hold the shoulder webbing strips 62L, 62R in place to facilitate retention of the passenger in the seat 28. Alternatively, if the load is applied to the passenger and/or shoulder webbing strips 62L, 62R does not exceed a certain level, then the retractor assembly can be configured to enable length adjustment of the shoulder webbing strips 62L, 62R. For example, the length of the shoulder webbing strips 62L, 62R can be adjusted for comfort under normal operating conditions of the vehicle 10.

In some embodiments, the retractor assembly can be configured to automatically take up slack so that the shoulder webbing strips 62L, 62R automatically fit different sized passengers. This feature also can facilitate passenger comfort while the vehicular seat belt assembly 30 is buckled and while a significant load is not being applied to the passenger and vehicular seat belt assembly 30. For example, the retractor assembly can enable the length of the shoulder webbing strips 62L, 62R to change, which enables the passenger to move around in the passenger's seat, thereby facilitating freedom of movement.

In the embodiment of FIG. 3, the retractor assembly can include a retractor 80 and an intermediate webbing 94. The retractor 80 can perform the operations disclosed above with regard to adjustability/locking of the lengths of the shoulder webbing strips 62L, 62R. In the embodiment shown in FIG. 3, the retractor 80 is connected to the webbing ring 78, and thereby the shoulder webbing strips 62L, 62R, by the intermediate webbing 94. However, embodiments are intended to include or otherwise cover any other type or method of attaching (directly or indirectly) the retractor 80 to the shoulder webbing strips 62L, 62R. For example, many embodiments do not include the webbing ring 78. Thus, in some embodiments, the intermediate webbing 94 or the retractor 80 is directly connected to the shoulder webbing strips 62L, 62R, such as by stitching or sewing. In other embodiments that do not include the webbing ring 78, the intermediate webbing 94 or the retractor 80 is attached to the shoulder webbing strips 62L, 62R via other apparatus. In fact, embodiments are intended to include or otherwise cover any other known, related art or later developed apparatus for performing any of the above operations of the retractor assembly.

IV. Seat Belt Assembly Mounting

Figure 4:
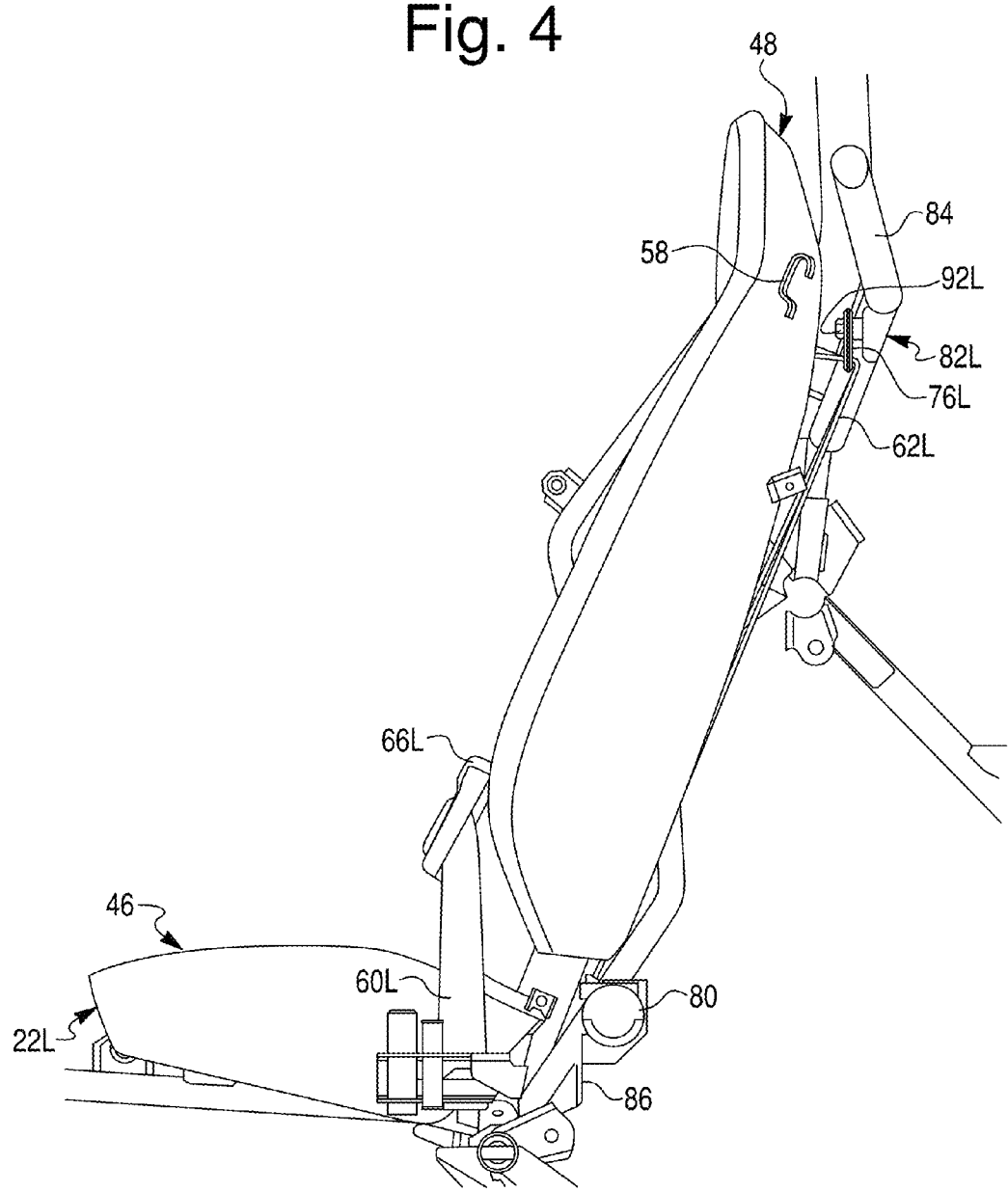
FIG. 4 is a side view of an exemplary seating and restraint system in accordance with the disclosed subject matter.

FIGS. 4-6 are side, front and rear views, respectively, of the exemplary seating and restraint system in accordance with the vehicle 10 shown in FIGS. 1 and 2. FIGS. 4-6 particularly show certain features relevant to mounting of various elements of the seat belt assembly.

As shown in these figures, the shoulder webbing strips 62L, 62R can extend through a seat aperture 58 defined in the upper seat portion 48 of the seat 28. The D-Ring anchors 76L, 76R can be disposed adjacent a rear surface of the upper seat portion 48 of the seat 22L.

As shown in FIG. 4, the D-Ring anchors 76L, 76R can be secured to a structural element of the vehicle, and in particular a mid-roll bar pipe 84. This pipe 84 may also be referred to as a Mid-ROPS (Roll Over Protective Structure). The mid-roll bar pipe 84 can be a load-bearing structural member of the vehicle frame 34 and/or the roll cage 18. The mid-roll bar pipe 84 can be a component of, or otherwise securely connected to, the roll cage 18. In other embodiments, this pipe 84 can be part of the main frame body. In fact, this pipe 84 can be constituted by any cross pipe extending laterally across the vehicle. However, embodiments are intended to cover attaching the D-Ring anchors 76L, 76R to any other appropriate structural element securely connected to the vehicle frame 34 or other relevant element, directly or indirectly.

In the embodiment shown in FIGS. 4-6, the D-Ring anchors 76L, 76R can be secured to the mid-roll bar pipe 84 by a respective D-Ring mounting assembly 82L, 82R. In particular, each D-Ring mounting assembly 82L, 82R can include a D-Ring mounting bracket 90L, 90R and a fastener 92L, 92R. In the embodiment of FIGS. 4-6, each fastener 92L, 92R can be in the form of a threaded bolt that connects the D-Ring mounting bracket 90L, 90R, and thereby the D-Ring anchors 76L, 76R, to the mid-roll bar pipe 84. However, embodiments are intended to include or otherwise cover any other apparatus for attaching the D-Ring anchors

76L, 76R to the mid-roll bar pipe 84 such as but not limited to other mechanical fasteners (rivets, screws, etc.), welding, etc.

As shown in FIGS. 4-6, shoulder webbing strips 62L, 62R can each extend through an aperture defined in one of the D-Ring anchors 76L, 76R, and change their direction of extension at the D-Ring anchors 76L, 76R. This configuration can enable the D-Ring anchors 76L, 76R to absorb a portion of a load created by the force applied to the passenger and applied to the shoulder webbing strips 62L, 62R, and then to communicate this absorbed load to the mid-roll bar pipe 84.

Absorbing this load can be beneficial because it can remove at least a portion of the load that would otherwise be communicated to the passenger due to forces created upon a vehicular impact event. Reducing the load communicated to the passenger can thus impede, reduce or prevent passenger trauma or injuries that would otherwise result from the impact event.

As shown in FIG. 4, the retractor 80 can be secured to the vehicle frame 34 by a retractor anchor 86. Embodiments are intended to include or otherwise cover any apparatus for securing the retractor 80 to the vehicle frame 34 or any other appropriate structural element(s).

V. Operation

In accordance with the operation of some of the disclosed embodiments, a passenger sits in the seat 22L and connects the buckle 68 to the tongue 70 to lock the upper lap webbing strips 60L, 60R and shoulder webbing strips 62L, 62R in place. The retractor 80 can automatically remove slack in the shoulder webbing strips 62L, 62R to properly fit the passenger. The retractor 80 also can allow for length adjustments of the shoulder webbing strips 62L, 62R while a significant load is not being applied (such as would be caused during an impact with or by another object) to enable the passenger to move around in the seat 22L.

The shoulder webbing strips 62L, 62R can extend vertically over opposing sides of a front of the passenger's upper body, and thereby provide advantageous support of the upper body, even in the event of an impact by or with another object and application to the passenger of the forces caused thereby. In addition, the D-Ring anchors 76L, 76R can absorb a portion of a load created by the force applied to the passenger and applied to the shoulder webbing strips 62L, 62R, and then communicate this absorbed load to the mid-roll bar pipe 84. As indicated above, absorbing this load can be beneficial because it can remove at least a portion of the load that would otherwise be communicated to the passenger, and thereby can impede, reduce or prevent passenger trauma or injuries that would otherwise result from the vehicular impact event. Further, in spite of the significant support provided to the passenger's upper body by the shoulder webbing strips 62L, 62R, the retractor 80 can enable the passenger to freely move in place in the seat 22L while the assembly is buckled, assuming that significant forces are not being applied to the passenger, assembly, etc.

VI. Alternative Embodiments

While certain embodiments of the invention are described above, and FIGS. 1-6 disclose the best mode for practicing the various inventive aspects, it should be understood that the invention can be embodied and configured in many different ways without departing from the spirit and scope of the invention.

The vehicle of FIGS. 1 and 2 can include four seats (while only one seat is illustrated in FIG. 2). Embodiments are intended to include or otherwise cover vehicles having any number of seats. For example, the disclosed and similar seat belt assemblies can be used for vehicular rear seats, seats on buses, trains, airplanes, etc. In fact, the disclosed seat belt assemblies can even be used in non-vehicular applications.

The vehicle 10 of FIGS. 1 and 2 has four seats arranged in two rows. However, embodiments are intended to include or otherwise cover vehicles having any number of seats all arranged in a row, or all arranged in tandem, or arranged in any number of rows. Embodiments are intended to include or otherwise cover a single seat for each vehicle occupant, or a single seat for a plurality of vehicle occupants (also referred to as a bench seat).

The embodiments are disclosed in the context of vehicular seats for adults. However, the disclosed seat belt assemblies can also be used for seats specially designed or configured for infants, children, etc.

In some of the embodiments disclosed in the context of FIGS. 3-6, the shoulder webbing strips 62L, 62R can be unitary, and thus form a unitary vertically extending webbing strip. However, embodiments are intended to include or otherwise cover other configurations. For example, the shoulder webbing strips 62L, 62R do not need to be unitary, i.e., formed from a single piece of the same material, and instead can be integral or otherwise connected together. Embodiments in which the shoulder webbing strips 62L, 62R are connected together are intended to include or otherwise cover any known, related art or later developed technique for providing this connection, including stitching, rivets, glue, epoxy, etc.

In fact, the shoulder webbing strips 62L, 62R might not be unitary, integral or otherwise connected in any manner. In these embodiments, the shoulder webbing strips 62L, 62R can be completely separate and independent components. In some of these embodiments, a separate retractor assembly can be provided for each respective independent shoulder webbing strip 62L, 62R. Other modifications can also be made to some of the features disclosed above to accommodate the shoulder webbing strips 62L, 62R being independent. For example, separate apertures can be defined in the upper seat portion 48 for the shoulder webbing strips 62L, 62R. In other words, each shoulder webbing strip 62L, 62R can be extended through a separate hole defined in the upper seat portion 48.

In fact, this feature can be provided for the embodiments shown in FIGS. 1-6 that utilize a unitary or integral vertically extending webbing strip. In other words, the single seat aperture 58 of the embodiments shown in FIGS. 1-6 can be modified to be two separate apertures, and a respective one of the shoulder webbing strips 62L, 62R can extend through each aperture.

In the embodiments shown in FIGS. 1-6, the unitary vertically extending webbing strip can include two shoulder webbing strips 62L, 62R that extend in parallel along a generally vertical direction. However, embodiments are intended to include or otherwise cover shoulder webbing strips 62L, 62R that extend in any other direction that may be beneficial for the relevant application. For example, the shoulder webbing strips 62L, 62R may extend in non-parallel directions or be arranged in an asymmetrical pattern about the passenger.

In fact, embodiments are intended to include or otherwise cover any number of shoulder webbing strips 62L, 62R. For example, three, four, or more shoulder webbing strips can be provided in any orientations that are beneficial.

As disclosed above, embodiments are intended to be used with any type of vehicle. The power source of the vehicle can be an internal combustion engine, an electric motor, or a hybrid of an internal combustion engine and an electric motor. The power source configured as an internal combustion engine or a hybrid power source can have the engine output axis oriented in the longitudinal direction or in the traverse direction of the vehicle. The engine can be mounted forward of the front axles, rearward of the rear axles, or intermediate the front and rear axles.

The vehicle can include any type of transmission, including an automatic transmission, a manual transmission, or a semi-automatic transmission. The transmission can include an input shaft, an output shaft, and a speed ratio assembly.

Embodiments are also intended to include or otherwise cover methods of using and methods of manufacturing any or all of the elements disclosed above. The methods of manufacturing include or otherwise cover processors and computer programs implemented by processors used to design various elements of the adjustable arm rest mechanism disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A vehicular seat belt assembly for use with a vehicle, a vehicle seat that can be occupied by a vehicle passenger, and a vehicle support structure, the vehicle seat belt assembly being configured for restraining the vehicle passenger disposed in the seat upon application of a force applied to the passenger, the restraint being performed via cooperation with the vehicle support structure and based at least in part by contact with the passenger's lap and upper body, the vehicular seat belt assembly comprising:
   a pair of lateral webbing strips configured to extend laterally across the passenger's lap and that each define distal and proximal ends, the distal end of each lateral webbing strip configured for being statically secured to the vehicular support structure, and the proximal ends being manually connectable and dis-connectable from each other;
   a vertically extending webbing strip that includes a pair of upper body strips that are configured to contact opposite sides of a front of the passenger's upper body, a proximal end of each upper body strip being connected to a respective one of the lateral webbing strips;
   an anchor that is configured for being statically secured to the vehicular support structure, the anchor being configured to guide each of the upper body strips so as to enable a change in a direction of extension of the upper body strips, and to thereby absorb a portion of a load created by the force applied to the passenger and applied to the upper body strips; and
   a retractor assembly that is configured to enable length adjustment of the vertically extending webbing strip if the load applied to the upper body strips is below a certain threshold level, while limiting or disabling length adjustment of the vertically extending webbing strip if the load is substantially equal to or greater than the certain threshold level.

2. The vehicular seat belt assembly according to claim 1, wherein the proximal end of one of the lateral webbing strips includes a buckle, and the proximal end of the other lateral webbing strip includes a tongue that is configured to be selectively connected with and disconnected from the buckle.

3. The vehicular seat belt assembly according to claim 1, wherein each of the upper body strips includes a pad configured to enhance passenger comfort and upper body support, each pad having a width that is greater than a width of the remainder of the associated upper body strip.

4. The vehicular seat belt assembly according to claim 1, wherein the anchor includes a pair of D-Ring mounting assemblies that are secured to the vehicular support structure, each D-Ring mounting assembly defining an aperture through which a respective one of the upper body strips extends.

5. The vehicular seat belt assembly according to claim 4, wherein each D-Ring mounting assembly includes a D-Ring anchor, which defines the aperture through which one of the upper body strips extends, and a bracket that connects the D-Ring anchor to the vehicular support structure via a fastener.

6. The vehicular seat belt assembly according to claim 1, further comprising a webbing ring, wherein the upper body strips are unitary and thereby form a unitary vertically extending webbing strip, the unitary upper body strips meeting at the webbing ring so as to form at least in part a V-Shaped configuration.

7. The vehicular seat belt assembly according to claim 6, wherein the retractor assembly includes a retractor and an intermediate webbing that defines opposite ends, one end of the intermediate webbing being connected to the webbing ring and the opposite end being connected to the retractor.

8. The vehicular seat belt assembly according to claim 7, wherein the retractor assembly includes a retractor anchor that statically secures the retractor to the vehicular support structure.

9. The vehicular seat belt assembly according to claim 1, wherein the seat is configured to include an upper portion defining an aperture and opposing front and back sides, the front side being configured to support the passenger's upper body, each of the upper body strips configured to extend through the aperture, the anchor configured to be disposed adjacent the back side of the upper portion of the seat, and the anchor configured for being disposed adjacent the aperture.

10. The vehicular seat belt assembly according to claim 1, further comprising a pair of guides that are each disposed adjacent the proximal end of one of the lateral webbing strips, each of the guides defining a pair of apertures that are configured such that a respective one of the lateral webbing strips extends through one of the pair of apertures and a respective one of the upper body strips extends through the other aperture.

11. A vehicular seating and restraint system for use with a vehicle, which can be occupied by a vehicle passenger, and a vehicle support structure, the vehicular seating and restrain system being configured for restraining the vehicle passenger upon application of a force applied to the passenger, the restraint being performed via cooperation with the vehicle support structure and based at least in part by contact with the passenger's lap and upper body, the vehicular seating and restraint system comprising:
   a seat that includes an upper portion defining an aperture and opposing front and back sides, the front side being configured to support the passenger's upper body; and
   a vehicular seat belt assembly that includes:
      a lap restraint assembly that includes a pair of lap anchors and a pair of lateral webbing strips that are configured to extend laterally across the passenger's lap and that each define distal and proximal ends, the distal end of each lateral webbing strip configured for being statically secured to the vehicular support structure by one of the lap anchors, and the proximal ends being manually connectable and dis-connectable from each other;

a vertically extending webbing strip that includes a pair of upper body strips that are configured to contact opposite sides of a front of the passenger's upper body and extend through the aperture of the seat, a proximal end of each upper body strip being connected to a respective one of the lateral webbing strips;

an anchor that is configured for being statically secured to the vehicular support structure adjacent the back side of the upper portion of the seat, the anchor being configured to guide each of the upper body strips so as to enable a change in a direction of extension of the upper body strips, and to thereby absorb a portion of a load created by the force applied to the passenger and applied to the upper body strips; and a retractor assembly that is configured to enable length adjustment of the vertically extending webbing strip if the load applied to the upper body strips is below a certain threshold level, while limiting or disabling length adjustment of the vertically extending webbing strip if the load is substantially equal to or greater than the certain threshold level.

12. The vehicular seating and restraint system according to claim 11, wherein the proximal end of one of the lateral webbing strips includes a buckle, and the proximal end of the other lateral webbing strip includes a tongue that is configured to be selectively connected to and disconnected from the buckle.

13. The vehicular seating and restraint system according to claim 11, wherein each of the upper body strips includes a pad configured to enhance passenger comfort and upper body support, each pad having a width that is greater than a width of the remainder of the associated upper body strip.

14. The vehicular seating and restraint system according to claim 11, wherein the anchor includes a pair of D-Ring mounting assemblies that are secured to the vehicular support member, each D-Ring mounting assembly defining an aperture through which a respective one of the upper body strips extends.

15. The vehicular seating and restraint system according to claim 14, wherein each D-Ring mounting assembly includes a D-Ring anchor, which defines the aperture through which one of the upper body strips extends, and a bracket that connects the D-Ring anchor to the vehicular support structure via a fastener.

16. The vehicular seating and restraint system according to claim 11, further comprising a webbing ring, wherein the upper body strips are unitary and thereby form a unitary vertically extending webbing strip, the unitary upper body strips meeting at the webbing ring so as to form at least in part a V-Shaped configuration.

17. The vehicular seating and restraint system according to claim 16, wherein the retractor assembly includes a retractor and an intermediate webbing that defines opposite ends, one end of the intermediate webbing being connected to the webbing ring and the opposite end being connected to the retractor.

18. The vehicular seating and restraint system according to claim 17, wherein the retractor assembly includes a retractor anchor that statically secures the retractor to the vehicular support structure.

19. The vehicular seating and restraint system according to claim 11, further comprising a pair of guides that are each disposed adjacent the proximal end of one of the lateral webbing strips, each of the guides defining a pair of apertures that are configured such that a respective one of the lateral webbing strips extends through one of the pair of apertures and a respective one of the upper body strips extends through the other aperture.

20. A method of configuring a vehicular seat belt assembly to enable restraint of a vehicular passenger disposed in a seat upon application of a force applied to the passenger, the method comprising:

extending a pair of lateral webbing strips laterally across a lower portion of the seat such that proximal ends of the lateral webbing strips are manually connectable to and dis-connectable from each other;

statically securing a distal end of each lateral webbing strip to a vehicular support structure;

disposing a vertically extending webbing strip, which includes a pair of upper body strips, such that the upper body strips extend over opposite sides of a front of an upper portion of the seat;

connecting a proximal end of each upper body strip to a respective one of the lateral webbing strips;

statically securing an anchor to the vehicular support structure;

disposing the anchor to guide each of the upper body strips so as to enable a change in a direction of extension of the upper body strips, and to thereby be configured to absorb a portion of a load created by the force applied to the passenger and applied to the upper body strips; and connecting a retractor assembly to the vertically extending webbing strip to enable length adjustment of the vertically extending webbing strip if the load applied to the upper body strips is below a certain threshold level, while limiting or disabling length adjustment of the vertically extending webbing strip if the load is substantially equal to or greater than the certain threshold level.

* * * * *